United States Patent
Yoshimoto et al.

(10) Patent No.: US 10,711,170 B2
(45) Date of Patent: Jul. 14, 2020

(54) TWO-COMPONENT TYPE URETHANE-BASED ADHESIVE COMPOSITION FOR AN AUTOMOBILE

(71) Applicant: Sunstar Engineering Inc., Osaka (JP)

(72) Inventors: Yasuyuki Yoshimoto, Osaka (JP); Tomoharu Usa, Osaka (JP)

(73) Assignee: Sunstar Engineering Inc., Osaka (JP)

(*) Notice: Subject to any disclaimer, the term of this patent is extended or adjusted under 35 U.S.C. 154(b) by 49 days.

(21) Appl. No.: 16/068,288

(22) PCT Filed: Jan. 7, 2016

(86) PCT No.: PCT/JP2016/050363
§ 371 (c)(1),
(2) Date: Jul. 5, 2018

(87) PCT Pub. No.: WO2017/119103
PCT Pub. Date: Jul. 13, 2017

(65) Prior Publication Data
US 2019/0016934 A1    Jan. 17, 2019

(51) Int. Cl.
| | | |
|---|---|---|
| C08G 18/12 | (2006.01) |
| C09J 175/08 | (2006.01) |
| C09J 9/00 | (2006.01) |
| C08G 18/30 | (2006.01) |
| C08G 18/50 | (2006.01) |
| C08G 18/48 | (2006.01) |
| C08G 18/10 | (2006.01) |
| C08G 18/18 | (2006.01) |
| C08G 18/20 | (2006.01) |
| C08G 18/22 | (2006.01) |
| C08G 18/24 | (2006.01) |
| C08G 18/16 | (2006.01) |
| C08G 18/76 | (2006.01) |

(52) U.S. Cl.
CPC ............ *C09J 175/08* (2013.01); *C08G 18/10* (2013.01); *C08G 18/18* (2013.01); *C08G 18/2063* (2013.01); *C08G 18/227* (2013.01); *C08G 18/24* (2013.01); *C08G 18/307* (2013.01); *C08G 18/482* (2013.01); *C08G 18/4816* (2013.01); *C08G 18/5021* (2013.01); *C09J 9/00* (2013.01); *C08G 18/4829* (2013.01); *C08G 18/7671* (2013.01)

(58) Field of Classification Search
CPC .................................................. C08G 18/12
USPC .................................................. 528/65, 66
See application file for complete search history.

(56) References Cited

U.S. PATENT DOCUMENTS 4,835,012 A    5/1989   Saur
2012/0295104 A1    11/2012   Barker

FOREIGN PATENT DOCUMENTS

| JP | 61257318 A | 11/1986 |
|---|---|---|
| JP | S6411179 B1 * | 2/1989 |
| JP | 2004339315 A | 12/2004 |
| JP | 2006176664 A | 7/2006 |
| JP | 2007031483 A | 2/2007 |
| JP | 2013072016 A | 4/2013 |

OTHER PUBLICATIONS

International Search Report dated Mar. 15, 2016, from related Application No. PCT/JP2016/050363, 2 pages.
English Translation of the International Preliminary Report on Patentability for Application No. PCT/JP2016/050363 dated Jul. 10, 2018.
Extended European Search Report dated Jun. 25, 2019 in related European Application No. 16883606.2 (7 pages).

* cited by examiner

*Primary Examiner* — Duc Truong
(74) *Attorney, Agent, or Firm* — Meunier Carlin & Curfman LLC

(57) ABSTRACT

The present invention provides a two-component type urethane-based adhesive composition for an automobile, which has a good productivity because of high curing rate, which there is not much change between physical properties of a cured product formed from a first component alone and those of a cured product formed from a mixture of first and second components, and which it is possible to satisfy required performances for an automotive adhesive without the second component. The present invention relates to a two-component type urethane-based adhesive composition for an automobile comprising (1) a first component comprising an isocyanate group-terminated polyether polyol compound, and (2) a second component comprising a polyol compound and curing catalyst, wherein a cured product from the first component alone has an elastic modulus of 5 to 20 MPa and an elongation of 300 to 850%, and wherein a cured product from a mixture of the first and second components at a mixing ratio of the first component to the second component of 100/10 has an elastic modulus of 3 to 20 MPa and an elongation of 300 to 650%.

5 Claims, No Drawings

TWO-COMPONENT TYPE URETHANE-BASED ADHESIVE COMPOSITION FOR AN AUTOMOBILE

TECHNICAL FIELD

The present invention relates to a two-component type urethane-based adhesive composition for an automobile, which has a good productivity because of high curing rate; which there is not much change between physical properties of a cured product formed from a first component (main agent) alone and those of a cured product formed from a mixture of a first component (main agent) and a second component (curing agent); and which it is possible to satisfy required performances for an automotive adhesive without the second component.

BACKGROUND OF THE INVENTION

Hitherto one-component materials have been mainly used for an automotive adhesive because of complicated management. However, since it has taken at least one day until the adhesive is fully cured in case of using one-component type moisture-curing materials, technologies of two-component materials separated into a first component (main agent) and a second component (curing agent) have been proposed for the purpose of accelerating the curing (Patent Documents 1 to 3).

However, since it is necessary to avoid an addition of an excessive amount of a third component to the two-component material in order to maintain a structure of a cured product of a main agent as the purpose of accelerating the curing of the main agent which is also used as one-component material, a mixing ratio of the third component, that is, a curing agent component is low. In addition, when an amount of the curing agent component is large, it is impossible to maintain physical properties of the cured product of only the main agent. Therefore, in prior art, since there were problems of a process management such as weighting accuracy and difficulty of uniformly mixing because of very low ratio of the curing agent and there was a difference between physical properties of a cured product formed from the main agent alone and physical properties of a cured product formed from the main agent and the curing agent component when increasing an amount of the curing agent component, it was often difficult to use the main agent in the both cases of using as a one-component material and using as a main agent of a two-component material, and there was a problem that it does not function as the two component material for accelerating the curing thereof.

Therefore, two-component type urethane-based adhesives for an automobile which have a good productivity because of high curing rate; and which it is possible to satisfy required performances for an automotive adhesive without the second component (curing agent) have been required.

PRIOR ART

Patent Documents

Patent Document 1: JP 62-163781 A
Patent Document 2: JP 2007-31483 A
Patent Document 3: JP 2004-339315 A

OBJECTS OF THE INVENTION

An object of the present invention is to solve the above mentioned problems concerning conventional two-component type urethane-based adhesives for an automobile and to provide a two-component type urethane-based adhesive composition for an automobile, which has a good productivity because of high curing rate; which there is not much change between physical properties of a cured product formed from a first component (main agent) alone and those of a cured product formed from a mixture of a first component (main agent) and a second component (curing agent); and which it is possible to satisfy required performances for an automotive adhesive without the second component (curing agent).

The present inventors have intensely studied solutions for solving the above mentioned problems and have found that it is possible to provide a two-component type urethane-based adhesive composition for an automobile, which has a good productivity because a curing rate is high and a manufacturing time is short by using a two-component type urethane-based adhesive comprising a curing catalyst in a second component (curing agent);

and which it is possible to satisfy required performances for an automotive adhesive without the second component (curing agent) by adjusting physical properties of cured products such that there is not much change between physical properties of a cured product formed from a first component (main agent) alone and those of a cured product formed from a mixture of a first component (main agent) and a second component (curing agent). The present invention has been completed based on the above finding.

SUMMARY OF THE INVENTION

The present invention relates to a two-component type urethane-based adhesive composition for an automobile comprising:

(1) a first component comprising an isocyanate group-terminated polyether polyol compound, and
(2) a second component comprising a polyol compound and a curing catalyst,
wherein a cured product formed from the first component alone has an elastic modulus of 5 to 20 MPa and an elongation of 300 to 850%,
and wherein a cured product formed from a mixture of the first and second components at a mixing ratio of the first component to the second component (first component:second component) of 100:10 has an elastic modulus of 3 to 20 MPa and an elongation of 300 to 650%.

In order to suitably carry out the present invention, it is desired that:

the curing catalyst is selected from the group consisting of 1, 8-diazabicyclo [5.4.0] undecene-7 (DBU), 1, 5-diazabicyclo [4.3.0] nonene-5 and 1, 4-diazabicyclo [2.2.2] octane, and phenol salts thereof, octylic acid salts thereof, p-toluene sulfonic acid salts thereof and formic acid salts thereof;

the polyol compound in the second component has an average hydroxyl value of the polyols of 40 to 100 [mgKOH/g], and comprises 2 to 50% by mass of a multifunctional polyol having a number of hydroxyl groups of 2.3 to 10 and a hydroxyl value of 160 to 550 [mgKOH/g], based on the mass of the polyol compound;

the polyol compound in the second component comprises 0.5 to 5% by mass of a multifunctional polyol having a number of hydroxyl groups of 4 to 10 and a hydroxyl value of 350 to 550 [mgKOH/g], based on the mass of the polyol compound; and the multifunctional polyol comprises a sugar base having a hydroxyl value of 350 to 550 [mgKOH/g].

Effects of the Invention

The two-component type urethane-based adhesive composition for an automobile of the present invention has a good productivity because a curing rate is increased and a manufacturing time is shortened by using a two-component type adhesive comprising a curing catalyst in a second component (curing agent); and it is possible to satisfy required performances for an automotive adhesive without the second component (curing agent) because there is not much change between physical properties of a cured product formed from a first component (main agent) alone and those of a cured product formed from a mixture of first component (main agent) and second component (curing agent).

DESCRIPTION OF THE PREFERRED EMBODIMENTS

The two-component type urethane-based adhesive composition for an automobile of the present invention comprises:
(1) a first component comprising an isocyanate group-terminated polyether polyol compound, and
(2) a second component comprising a polyol compound and a curing catalyst.

The isocyanate group-terminated polyether polyol compound used in the first component (main agent) of the two-component type urethane-based adhesive composition for an automobile of the present invention includes an isocyanate group-terminated prepolymer obtained by the reaction of polyether polyol with an excessive amount of isocyanate compound (usually, OH/NCO=1/1.5 to 1/4) due to a well-known method. Examples of the polyether polyols include polyether polyols, such as polyoxyalkylenepolyol including polyoxytetramethylenediol and polyoxypropylenepolyol, modified polyether polyols, polytetramethyleneetherglycol; polyester polyol, such as condensation polyester polyols, lactone-based polyester polyols and polycarbonatediol; polyols containing a main chain composed of C—C bonds, such as acrylic polyols, polybutadiene-based polyols, polyolefin-based polyols and saponified ethylene-vinyl acetate copolymers; other flame-retardant polyols, such as phosphorus-containing polyols and halogen-containing polyols.

Examples of the isocyanate compounds include, for example, tolylene diisocyanate (TDI), 4, 4'-diphenylmethane diisocyanate (MDI), xylylene diisocyanate (XDI), hexamethylene diisocyanate (HDI), isophorone diisocyanate (IPDI), lysine diisocyanate, isopropylidene-bis(4-cyclohexylisocyanate), hydrogenated XDI and the like.

Examples of the polyol compounds used for the second component (curing agent) of the two-component type urethane-based adhesive composition for an automobile of the present invention include polyether polyols obtained by addition polymerization of polyhydric alcohols such as ethylene glycol, propylene glycol, trimethylolpropane, pentaerythritol, sorbitol and sucrose with alkylene oxides such as propylene oxide, or propylene oxide and ethylene oxide; ethylene glycol, propylene glycol and oligoglycols thereof; butylene glycol, hexylene glycol, polytetramethylene ether glycols; polycaprolactone polyols; polycarbonate polyols; polyester polyols such as polyethylene adipate; polybutadiene polyols; higher fatty acid esters having a hydroxyl group such as castor oil; polymer polyols obtained by grafting a vinyl monomer to polyether polyols or polyester polyols; and the like. The polyol compound may be used alone or in combination of two or more thereof.

In addition, it is desired for the polyol compound in the second component to contain two or more polyols, to have an average hydroxyl value of 40 to 200 [mgKOH/g], preferably 40 to 100 [mgKOH/g], and to comprise 2 to 50% by mass, preferably 10 to 40% by mass of a multifunctional polyol having a number of hydroxyl groups of 2.3 to 10 and a hydroxyl value of 160 to 550 [mgKOH/g], based on the mass of the polyol compound. When the average hydroxyl value is not less than 40 [mgKOH/g], the elastic modulus of the cured product may be adjusted to not less than 3 MPa. On the other hand, when the average hydroxyl value is not more than 200 [mgKOH/g], the elongation of the cured product may be adjusted to not less than 300%. When the amount of the multifunctional polyol is not less than 2% by mass, the elastic modulus of the cured product may be adjusted to not less than 3 MPa. On the other hand, when the amount of the multifunctional polyol is not more than 50% by mass, the elongation of the cured product may be adjusted to not less than 300%.

Furthermore, it is desired for the polyol compound in the second component to comprise 0.5 to 5% by mass, preferably 1 to 3% by mass of a multifunctional polyol having a number of hydroxyl groups of 4 to 10 and a hydroxyl value of 350 to 550 [mgKOH/g], based on the mass of the polyol compound. When the amount of the multifunctional polyol is not less than 0.5% by mass, the elastic modulus of the cured product may be adjusted to not less than 3 MPa. On the other hand, when the amount of the multifunctional polyol is not more than 5% by mass, the elongation of the cured product may be adjusted to not less than 300%.

Moreover, it is desired for the multifunctional polyol to comprise a sugar base having a hydroxyl value of 350 to 550 [mgKOH/g]. Examples of the sugar bases include polyether polyols obtained by addition polymerization of sugar-based polyhydric alcohols such as sucrose, glucose, sorbitol, mannitol and fructose with alkylene oxides such as propylene oxide, or propylene oxide and ethylene oxide. Concrete examples of the sugar bases include "Adeka Polyether SC-1000 (hydroxyl value: 445)", which is commercially available from ADEKA Corporation, and the like.

In the two-component type urethane-based adhesive composition, the cured product has high crosslinking density, and the elastic modulus is high by using the multifunctional polyol having large number of hydroxyl groups and large hydroxyl value in the second component, but the elongation is reduced. Therefore, the elastic modulus and elongation may be adjusted to specified ranges by adjusting a molecular weight and number of functional groups (number of hydroxyl groups) of the polyol compound in the second component, that is, by adjusting a mixing ratio of the multifunctional polyol to the polyol having lower number of hydroxyl groups and lower hydroxyl value than the multifunctional polyol to the above specified range.

The curing catalyst in the second component (curing agent) of the two-component type urethane-based adhesive composition is selected from the group consisting of 1, 8-diazabicyclo [5.4.0] undecene-7 (DBU), 1, 5-diazabicyclo [4.3.0] nonene-5 and 1, 4-diazabicyclo [2.2.2] octane, and phenol salts thereof, octylic acid salts thereof, p-toluene sulfonic acid salts thereof and formic acid salts thereof. In the two-component type urethane-based adhesive composition of the present invention, the above curing catalysts tend to have low curing rate at normal temperature and have high curing rate when heating to, for example, 40 to 60° C. as compared with the other catalysts. Therefore, the two-component type urethane-based adhesive has an advantage that it has long pot life, it has a good manufacturing workability, it has high curing rate when using, and it has a good productivity because of its reduced manufacturing time.

In addition to the curing catalyst, organic tin compounds such as tin octylate and dibutyl tin diacetylacetonate, a morpholine-based catalyst such as 2, 2'-dimorpholinodiethylether, a bismuth-based catalyst such as bismuth 2-ethylhexanoate, an amine-based catalyst such as dimethyltriethylenediamine, and the like, which are well-known as a catalyst for urethane-based adhesives, may be used in the two-component type urethane-based adhesive composition.

An amount of the curing catalyst is within the range of 0.5 to 5% by mass, preferably 0.8 to 3% by mass, more preferably 1 to 2% by mass, based on the total mass of the second component (curing agent) of the two-component type urethane-based adhesive composition. When the amount of the curing catalyst is not less than 0.5% by mass, a sufficient handling strength may be obtained. On the other hand, when the amount of the curing catalyst is not more than 5% by mass, the curing in mixing layer is not too early, and ejection failure, failures such as cholesterol and curing in the mixing layer, and the maintenance frequency may be reduced.

In the second component (curing agent) of the two-component type urethane-based adhesive composition, an amount of water is within the range of less than 2% by mass, preferably less than 1% by mass, based on the total mass of the second component. When the amount of water is less than 2% by mass, it is possible to prevent curing rate from reducing, and a sufficient handling strength may be obtained.

The two-component type urethane-based adhesive composition of the present invention may comprise a silane coupling agent for the purpose of improving its adhesion. Examples of the silane coupling agents include epoxysilanes such as γ-glycidoxypropyltrimethoxysilane, γ-glycidoxypropyltriethoxysilane, γ-glycidoxypropylmethyldimethoxysilane, β-(3, 4-epoxycyclohexyl)ethyltrimethoxysilane, β-(3, 4-epoxycyclohexyl) ethyltriethoxysilane;

mercaptosilanes such as γ-mercaptopropyltrimethoxysilane, γ-mercaptopropyltriethoxysilane, γ-mercaptopropylmethyldimethoxysilane, γ-mercaptopropylmethyldiethoxysilane, mercaptomethyltriethoxysilane, mercaptomethyldimethoxymethylsilane, mercaptomethyldiethoxymethylsilane;

isocyanatesilanes such as γ-isocyanatepropyltrimethoxysilane, γ-isocyanatepropyltriethoxysilane, γ-isocyanatepropylmethyldiethoxysilane, γ-isocyanatepropylmethyldimethoxysilane, (isocyanatemethyl) trimethoxysilane, (isocyanatemethyl) dimethoxymethylsilane;

aminoalkoxysilanes such as γ-(α-aminoethyl) aminopropyltrimethoxysilane, aminopropyltrimethoxysilane, γ-phenylaminopropyltrimethoxysilane, bis(trimethoxysilylpropyl)amine, N-(β-aminoethyl)-γ-aminopropyltrimethoxysilane, ureidopropyltriethoxysilane, N-(n-butyl)-γ-aminopropyltrimethoxysilane, N-(cyclohexyl)-γ-aminopropyltrimethoxysilane, N-methylaminopropyltrimethoxysilane; and ketone block bodies thereof. In the present invention, one or more of the silane coupling agents may be used.

An amount of the silane coupling agent is within the range of 0.05 to 5% by mass, preferably 0.1 to 3% by mass, more preferably 0.2 to 2% by mass, based on the total mass of the two-component type urethane-based adhesive composition.

The first component of the two-component type urethane-based adhesive composition may comprise an isocyanate compound for the purpose of improving its adhesion. Examples of the isocyanate compounds, which are not limited thereto, include polyisocyanates which are conventionally well known in the art, such as aromatic, alicyclic, aliphatic isocyanates, and a urethane-modified product thereof, an allophanate-modified product thereof, a urethodione-modified product thereof, an isocyanurate-modified product thereof, a carbodiimide-modified product thereof, a uretonimine-modified product thereof, a urea-modified product thereof, and a biuret-modified product thereof. In the present invention, one or more of the isocyanate compounds may be used. It is desired in view of the workability of the polyurethane-based adhesive that an amount of the isocyanate compound is within the range of 0.1 to 15% by mass, preferably 0.5 to 10% by mass, more preferably 1 to 5% by mass, based on the total mass of the two-component type urethane-based adhesive composition.

In addition, it is preferable to use a reaction product of the silane coupling agent and the isocyanate compound in view of stability of materials in a manufacturing process and improving adhesion of the polyurethane-based adhesive. The reaction product of the isocyanate compound and the silane coupling agent may be produced so as to adjust a ratio of NCO/(reaction group of silane coupling agent) to the range of 0.5 to 5.0, for example, the reaction product may be produced by reaction at 60 to 90° C. for about 1 hour while stirring so as to adjust a ratio of NCO/(reaction group of silane coupling agent) to the range of 0.5 to 5.0.

The two-component type urethane-based adhesive composition of the present invention may optionally contain plasticizers such as diisononylphthalate, dioctylphthalate, dibutylphthalate, dilaurylphthalate, butylbenzylphthalate, dioctyl adipate, diisodecyl adipate, trioctyl phosphate, tris (chloroethyl) phosphate, tris(dichloropropyl) phosphate, adipic acid-propylene glycol polyester, adipic acid-butylene glycol polyester, alkyl epoxy stearate, alkyl benzene, epoxidized soybean oil; fillers such as calcium carbonate, silica, carbon black, cray, talc, titanium oxide, calcium oxide, kaolin, zeolite, diatomaceous earth; modifiers such as acrylic resin; anti-aging agents, antioxidants; ultraviolet absorbers; light weight aggregates; pigments; and the like in a suitable amount as an usual additive.

Curing condition of the two-component type urethane-based adhesive composition of the present invention, which may vary depending on a type of adherend and manufacturing process capability, is usually at 40 to 90° C. for 5 to 10 minutes.

In the two-component type urethane-based adhesive composition of the present invention,
(1) a cured product formed from the first component alone has an elastic modulus of 5 to 20 MPa and an elongation of 300 to 850%,
(2) a cured product formed from a mixture of the first and second components at a mixing ratio of the first component to the second component (first component/second component) of 100/10 has an elastic modulus of 3 to 20 MPa and an elongation of 300 to 650%. Curing condition of the cured products is at 20° C. and 65% RH for 7 days in case of the cured product formed from the first component alone of the (1); and at 40 to 90° C. for 5 to 10 minutes in case of the cured product formed from a mixture of the first and second components of the (2). The elastic modulus as used herein means a storage modulus measured in accordance with JIS K7244 and the elongation as used herein means an elongation measured at a testing rate of 500 mm/min in accordance with JIS K6251 by using a test specimen having a thickness of 3 mm cut out with a dumbbell-shaped No. 2 die. When the cured product formed from the first component alone satisfies the elastic modulus and elongation of the (1) and the cured product formed from the mixture of the first and second components at the mixing ratio of the first component to the second component of 100/10 satisfies the elastic modulus and elongation of the (2), there is not much change between physical properties of the both cured products and it is possible to satisfy required performances for an automotive adhesive even if there is no second component (curing agent).

The two-component type urethane-based adhesive composition of the present invention may be used for a front window, a quarter window, a sunroof, a rear window, a door window and an outer panel of automobile and the like, particularly there is no variation in the physical properties of the cured product of the adhesive composition, and there is no variation in a quality of the automobile itself in the manufacturing process.

EXAMPLES

The following Examples and Comparative Examples more specifically illustrate the present invention, but are not to be construed to limit the present invention thereby.

Examples 1 to 6 and Comparative Examples 1 to 6

(1) Preparation of Isocyanate Group-Terminated Polyether Polyol Compound

To 3000 g of polyoxypropylenetriol having a hydroxyl value of 25.0, 350 g of 4,4'-diphenylmethanediisocyanate (MDI) was added, and they were reacted at 80° C. for 3 hours under a nitrogen atmosphere to prepare an isocyanate group-terminated urethane prepolymer having a free NCO group content of 1.90% and a viscosity (20° C.) of 50000 MPa·s as an isocyanate group-terminated polyether polyol compound.

(2) Preparation of First Component of Two-Component Type Urethane-Based Adhesive To 400 parts by mass of the isocyanate group-terminated urethane prepolymer, 250 parts by mass of diisononylphthalate, 250 parts by mass of dried carbon black, 250 parts by mass of calcium carbonate, 1 part by mass of 2, 2'-dimorpholinodiethylether and 0.2 parts by mass of dibutyl tin diacetylacetonate were added, and they were agitated and mixed under vacuum degassing to prepare one-component type moisture-curing urethane-based adhesive composition as a first component of two-component type urethane-based adhesive. A cured product of the resulting one-component type moisture-curing urethane-based adhesive composition, that is, a cured product formed from the first component alone (at 20° C. and 65% RH for 7 days) had an elastic modulus of 6 MPa, an elongation of 650%, an adhesion after fully curing of 3.3 MPa, an evaluation result of curability when heating of "x", and a tack-free time of not less than 60 minutes.

(3) Preparation of Two-Component Type Urethane-Based Adhesive

The second component formulations shown in Table 1 to Table 3 were uniformly mixed to prepare a second component. The resulting first and second components were uniformly mixed to prepare a two-component type urethane-based adhesive (a mixing ratio of the first component to the second component (first component/second component) of 10/1).

TABLE 1

|  |  | Example | | | | |
|---|---|---|---|---|---|---|
|  |  | 1 | 2 | 3 | 4 | 5 |
| Second component (Curing agent) Polyol compound | | | | | | |
| EXCENOL 5030 | *1 | 79 | 77 | 74 | 79 | 80 |
| EXCENOL 1030 | *2 | 20 | 20 | 20 | 20 | 20 |
| EXCENOL 450SN | *3 | 1 | 3 | 5 | — | — |
| EXCENOL 450ED | *4 | — | — | — | 1 | — |
| Water | | — | — | — | — | — |
| Filler | *5 | 50 | 50 | 50 | 50 | 50 |
| Curing catalyst | | | | | | |
| DBU | *6 | 0.6 | 0.6 | 0.6 | 0.6 | 1.3 |
| Bi-based | *7 | 1.2 | — | 1.2 | 1.2 | — |
| Sn-based | *8 | — | 1.2 | — | — | — |
| DMTEDA | *9 | — | — | — | — | — |
| Average hydroxyl value [mgKOH/g] | | 61 | 69 | 78 | 61 | 57 |
| Mixing ratio (First component/Second component) | | 10/1 | 10/1 | 10/1 | 10/1 | 10/1 |

TABLE 2

|  |  | Example | | | | |
|---|---|---|---|---|---|---|
|  |  | 6 | 7 | 8 | 9 | 10 |
| Second component (Curing agent) Polyol compound | | | | | | |
| EXCENOL 5030 | *1 | 94.5 | 60 | 55 | 79 | 97 |
| EXCENOL 1030 | *2 | 5 | 36 | 45 | 20 | — |
| EXCENOL 450SN | *3 | 0.5 | 3 | — | 1 | — |
| EXCENOL 450ED | *4 | — | — | — | — | — |
| Water | | — | 1 | — | — | 3 |
| Filler | *5 | 50 | 50 | 50 | 50 | 50 |
| Curing catalyst | | | | | | |
| DBU | *6 | 1.3 | 1.3 | 1.3 | — | 1.3 |
| Bi-based | *7 | — | — | — | — | — |
| Sn-based | *8 | — | — | — | — | 1.2 |
| DMTEDA | *9 | — | — | — | 5 | — |
| Average hydroxyl value [mgKOH/g] | | 41 | 152 | 89 | 61 | 217 |
| Mixing ratio (First component/Second component) | | 10/1 | 10/1 | 10/1 | 10/1 | 10/1 |

TABLE 3

|  |  | Comparative Example | | | |
|---|---|---|---|---|---|
|  |  | 1 | 2 | 3 | 4 |
| Second component (Curing agent) Polyol compound | | | | | |
| EXCENOL 5030 | *1 | 98.5 | 70 | 95.5 | 45 |
| EXCENOL 1030 | *2 | — | 20 | 1.5 | 54 |
| EXCENOL 450SN | *3 | 1.5 | 10 | — | 1 |
| EXCENOL 450ED | *4 | — | — | — | — |
| Water | | — | — | 3 | — |
| Filler | *5 | 50 | 50 | 50 | 50 |

TABLE 3-continued

|  |  | Comparative Example | | | |
|---|---|---|---|---|---|
|  |  | 1 | 2 | 3 | 4 |
| Curing catalyst | | | | | |
| DBU | *6 | 1.3 | 1.3 | 1.3 | 1.3 |
| Bi-based | *7 | — | — | — | — |
| Sn-based | *8 | 1.2 | 1.2 | 1.2 | 1.2 |
| DMTEDA | *9 | — | — | — | 5 |
| Average hydroxyl value [mgKOH/g] | | 37 | 99 | 219 | 105 |
| Mixing ratio (First component/Second component) | | 10/1 | 10/1 | 10/1 | 10/1 |

(*1): Polypropylene triol, which is commercially available from Asahi Glass Co., Ltd. under the trade name "Excenol 5030" (number of hydroxyl groups: 3, hydroxyl value: 33 [mgKOH/g])

(*2) Polypropylene triol, which is commercially available from Asahi Glass Co., Ltd. under the trade name "Excenol 1030" (number of hydroxyl groups: 3, hydroxyl value: 160 [mgKOH/g])

(*3): Sugar-based multifunctional polyol, which is commercially available from Asahi Glass Co., Ltd. under the trade name "Excenol 450SN" (number of hydroxyl groups: not less than 4, hydroxyl value: 450 [mgKOH/g])

(*4) Ethylene diamine-based polypropylene tetraol, which is commercially available from Asahi Glass Co., Ltd. under the trade name "Excenol 450ED" (number of hydroxyl groups: 4, hydroxyl value: 450 [mgKOH/g])

(*5) Calcium carbonate (*6) Octylic acid salt of 1, 8-diazabicyclo [5.4.0] undecene-7 (DBU)

(*7) Bi-based catalyst: bismuth 2-ethyl hexannoate (*8) Sn-based catalyst: Dibutyl tin diacetylacetonate (*9) Dimethyltriethylenediamine (3) Evaluation of Physical Properties With respect to the resulting one-component type and two-component type urethane-based adhesive compositions, the elastic modulus, elongation and adhesion were measured. The results are shown in Tables 4 to 6. The test methods are as follows.

(Test Method)

(1) Elastic Modulus

In accordance with JIS K7244, the resulting one-component type and two-component type urethane-based adhesive compositions were molded to a shape having a size of 1×1×40 mm to prepare test specimens, they were cured at 20° C. and 65% RH for 7 days, and a storage elastic modulus was measured at a frequency of 70 Hz and a measuring temperature of 20° C. using a dynamic viscoelasticity measuring device.

(2) Elongation

In accordance with JIS K6251, the resulting one-component type and two-component type urethane-based adhesive compositions were molded to a dumbbell-shaped No. 2 (a thickness of 3 mm) to prepare test specimens, they were cured at 20° C. and 65% RH for 7 days, and an elongation at break was measured at a tensile rate of 500 mm/min using an Instron type tensile tester.

(3) Adhesion

In accordance with JIS K6850, a primer (#435-41 manufactured by Sunstar Giken Kabushiki Kaisha) was coated on a glass plate and dried. The adhesive compositions were then coated thereon, were compressed such that the adhesive has a thickness of 3 mm, and were left at 20° C. and 65% RH for 72 hours. The one-component type and two-component type urethane-based adhesives were coated on an adherend (100×25 mm) such that an overlap length is 10 mm and a thickness is 3 mm, and adhesion test specimens were prepared.

(a) Initial Adhesion

The resulting test specimens coated with the two-component type urethane-based adhesives were cured at 45° C. for 9 minutes, and a tensile lap-shear strength was measured at a tensile rate of 200 mm/min using an Instron type tensile tester.

(b) Adhesion after Fully Curing

The resulting test specimens coated with the one-component type and two-component type urethane-based adhesives were cured at 20° C. for 7 days, and the tensile lap-shear strength was measured as described in the initial adhesion.

(4) Curability when Heating

The resulting test specimens coated with the one-component type and two-component type urethane-based adhesives into a bead shape having a diameter of 6 mm were heated at 80° C. for 10 minutes, and then the bead was cut after cooling to confirm whether there is an uncured portion in the bead. The curability when heating was evaluated by the following evaluation criteria.

Evaluation Criteria o: There is no uncured portion in the bead.

Δ: There are partly uncured portions in the bead.

x: There are 50% or more of uncured portions in the bead.

(5) Tack-Free Time

The one-component type and two-component type urethane-based adhesives were coated into a bead shape having a diameter of 6 mm, were then covered thereon with polyethylene sheet having a thickness of 0.1 mm, and were compressed such that the adhesive has a thickness of 3 mm. The adhesive was cured at 20° C. and 65% RH, and a curing time such that the polyethylene film and adhesive cause interfacial failure when peeling the film in the direction of 180° was measured.

TABLE 4

| | | Example | | | | |
|---|---|---|---|---|---|---|
| Evaluation result | | 1 | 2 | 3 | 4 | 5 |
| Mixture of first and second components | | | | | | |
| Elastic modulus [MPa] | | 5.1 | 5.5 | 5.8 | 5.4 | 3.8 |
| Elongation [%] | | 580 | 550 | 500 | 380 | 600 |
| Adhesion [MPa] | Initial | 0.25 | 0.25 | 0.25 | 0.25 | 0.15 |
| | After fully curing | 3.1 | 3.2 | 3.2 | 3.1 | 2.8 |
| Curability when heating | | o | o | o | o | o |
| Tack-free time [min] | | 17 | 14 | 11 | 11 | 23 |

TABLE 5

| | | Example | | | | |
|---|---|---|---|---|---|---|
| Evaluation result | | 6 | 7 | 8 | 9 | 10 |
| Mixture of first and second components | | | | | | |
| Elastic modulus [MPa] | | 4.4 | 5.8 | 3.2 | 5.5 | 5.5 |
| Elongation [%] | | 600 | 500 | 350 | 550 | 520 |
| Adhesion [MPa] | Initial | 0.16 | 0.30 | 0.18 | 0.08 | 0.09 |
| | After fully curing | 3.0 | 3.1 | 3.2 | 3.1 | 2.8 |

TABLE 5-continued

| | Example | | | | |
|---|---|---|---|---|---|
| Evaluation result | 6 | 7 | 8 | 9 | 10 |
| Mixture of first and second components | | | | | |
| Curability when heating | ○ | ○ | ○ | Δ | Δ |
| Tack-free time [min] | 17 | 21 | 13 | 60 | 35 |

TABLE 6

| | | Comparative Example | | | |
|---|---|---|---|---|---|
| Evaluation result | | 1 | 2 | 3 | 4 |
| Mixture of first and second components | | | | | |
| Elastic modulus [MPa] | | 2.8 | 2.8 | 2.4 | 6.0 |
| Elongation [%] | | 650 | 250 | 700 | 240 |
| Adhesion [MPa] | Initial | 0.25 | 0.25 | 0.08 | 0.25 |
| | After fully curing | 2.3 | 2.1 | 2.1 | 1.9 |
| Curability when heating | | ○ | ○ | Δ | ○ |
| Tack-free time [min] | | 22 | 14 | 50 | 15 |

As is apparent from the results shown in Table 4 to Table 6, in the two-component type urethane-based adhesives of Examples 1 to 6 of the present invention, there was not much change between physical properties of a cured product formed from a first component (main agent) alone and those of a cured product formed from a mixture of first component (main agent) and second component (curing agent), and the adhesion after fully curing was good.

On the other hand, in the two-component type urethane-based adhesives of Comparative Examples 1 to 4, which there was much change between physical properties of a cured product formed from a first component (main agent) alone and those of a cured product formed from a mixture of first component (main agent) and second component (curing agent), the adhesion after fully curing was poor.

What is claimed is:

1. A two-component type urethane-based adhesive composition for an automobile comprising:
   (1) a first component comprising an isocyanate group-terminated polyether polyol compound, and
   (2) a second component comprising a polyol compound and a curing catalyst,
   wherein the polyol compound in the second component comprises a polyol having an average hydroxyl value of 40 to 100 [mgKOH/g], and comprises 2 to 50% by mass of a multifunctional polyol having a number of hydroxyl groups from 2.3 to 10 and a hydroxyl value of 160 to 550 [mgKOH/g], based on the mass of the polyol compound,
   wherein a cured product formed from the first component alone has an elastic modulus of 5 to 20 MPa and an elongation of 300 to 850%,
   and wherein a cured product formed from a mixture of the first and second components at a mixing ratio of the first component to the second component of 100:10 has an elastic modulus of 3 to 20 MPa and an elongation of 300 to 650%.

2. The two-component type urethane-based adhesive composition for an automobile according to claim 1, wherein the curing catalyst is selected from the group consisting of 1, 8-diazabicyclo [5.4.0] undecene-7 (DBU), 1, 5-diazabicyclo [4.3.0] nonene-5 and 1, 4-diazabicyclo [2.2.2] octane, and phenol salts thereof, octylic acid salts thereof, p-toluene sulfonic acid salts thereof and formic acid salts thereof.

3. The two-component type urethane-based adhesive composition for an automobile according to claim 1, wherein the polyol compound in the second component comprises 0.5 to 5% by mass of a multifunctional polyol having a number of hydroxyl groups of 4 to 10 and a hydroxyl value of 350 to 550 [mgKOH/g], based on the mass of the polyol compound.

4. The two-component type urethane-based adhesive composition for an automobile according to claim 1, wherein the multifunctional polyol comprises a sugar base having a hydroxyl value of 350 to 550 [mgKOH/g].

5. The two-component type urethane-based adhesive composition for an automobile according to claim 1, wherein an amount of water in the second component is smaller than 2% by mass, based on the total mass of the second component.

* * * * *